Oct. 15, 1940.  E. T. FRISK  2,218,333
AMUSEMENT DEVICE
Filed July 5, 1938　　2 Sheets-Sheet 2
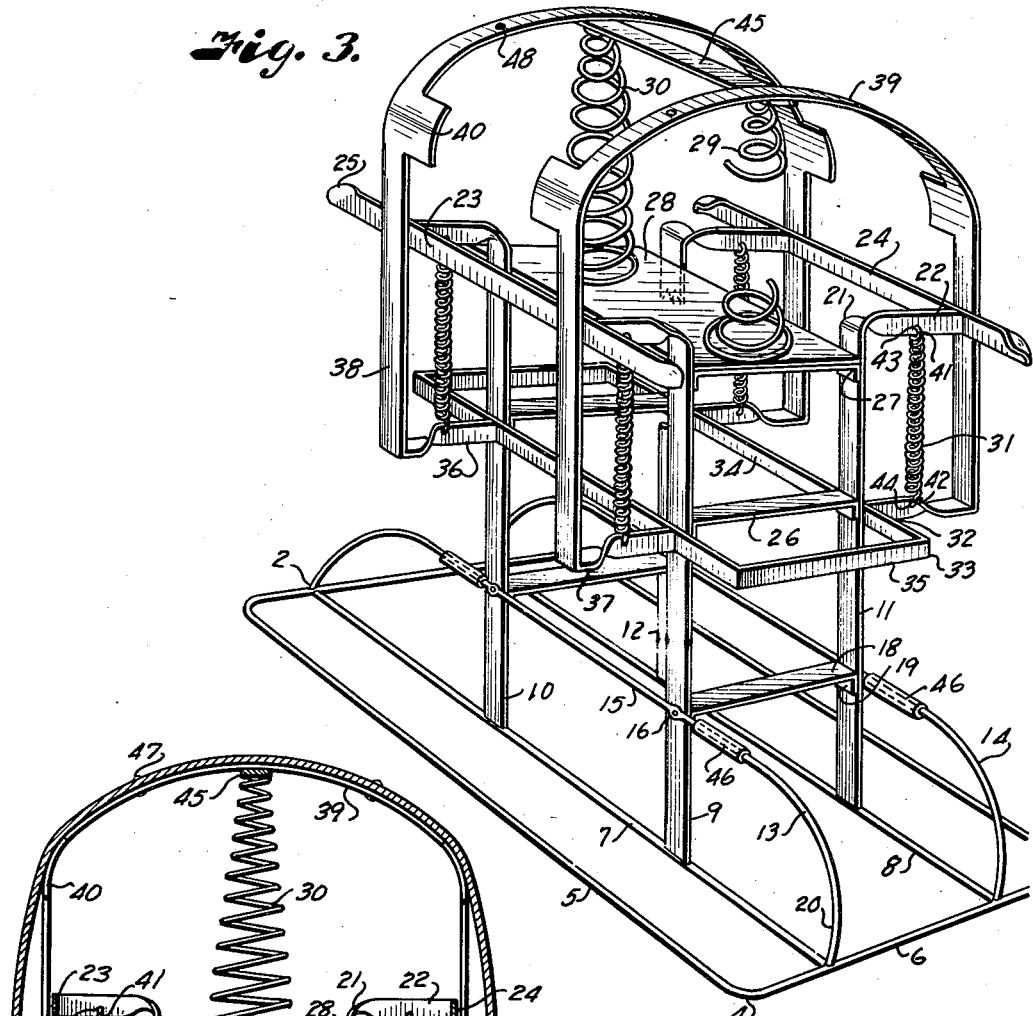
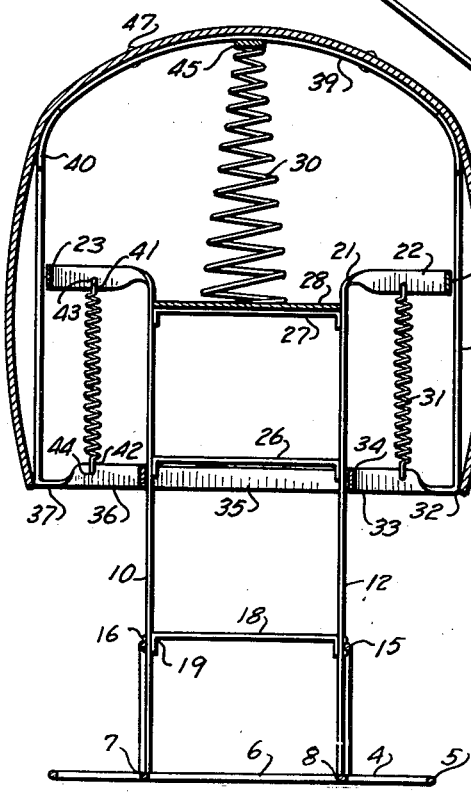
INVENTOR
Ernest T. Frisk.
BY
Arthur W. Brown
ATTORNEY Patented Oct. 15, 1940

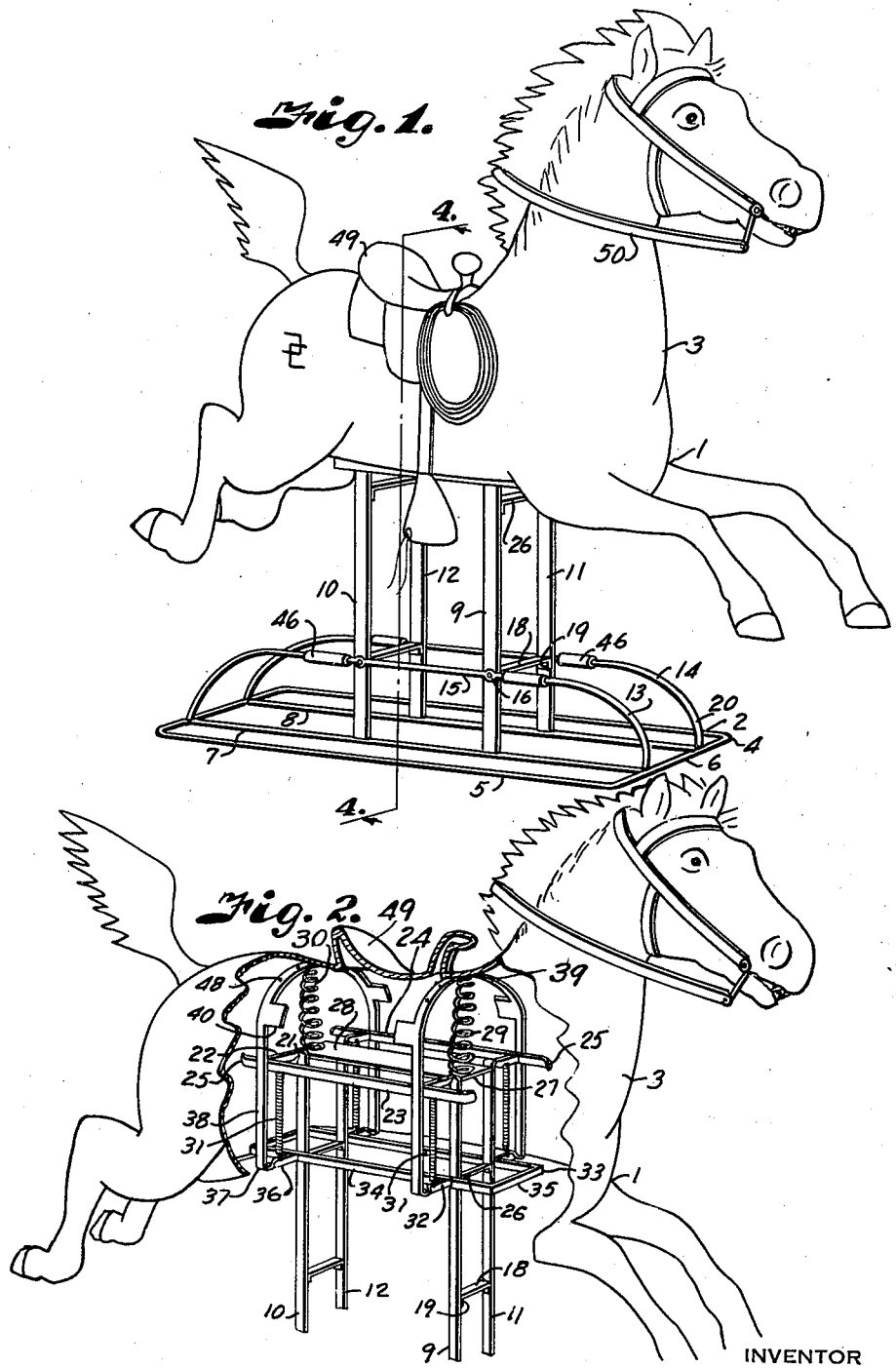

2,218,333

UNITED STATES PATENT OFFICE 2,218,333

AMUSEMENT DEVICE

Ernest T. Frisk, Hibbing, Minn.

Application July 5, 1938, Serial No. 217,403

8 Claims. (Cl. 272—52)

This invention relates to an amusement device, particularly a hobby-horse, and has for its principal object to provide a device of this character constructed to simulate bounding and bucking of a bronco when it is actuated by bodily movement of the rider.

Other important objects of the invention are to provide an attractive, easily operated device; to provide a strong and relatively inexpensive, light weight construction; to construct the action-giving parts so that they are enclosed within the body of the hobby-horse; to provide action-giving parts that are quiet in operation; and to provide means for preventing lateral movement of the horse under the bodily movement of the rider.

It is also an important object of the present invention to provide a strong, light weight, and substantially stream-line supporting base.

In accomplishing these and other objects of the invention, as hereinafter pointed out, I have provided improved details of structure, the preferred form of which is illustrated in the accompanying drawings, wherein:

Fig. 1 is a detail perspective view of a hobby-horse or like device embodying the features of the present invention.

Fig. 2 is a detail perspective view of the upper portion of the device showing the body of the horse broken away to better illustrate the action-giving parts.

Fig. 3 is an enlarged detail perspective view of the base and the action-giving parts of the device.

Fig. 4 is a cross-section on the line 4—4 of Fig. 1.

Referring more in detail to the drawings:

1 designates a hobby-horse constructed in accordance with the present invention, and which includes a base 2 movably mounting a horse or other figure 3 which a rider may mount. The base 2 is preferably formed of small pipe or rods, shaped to provide a rectangular floor engaging member 4, having side and end bars 5 and 6, with the end bars connected by intermediate bars 7 and 8 suitably spaced to mount the ends of uprights 9—10 and 11—12, the ends of the uprights being preferably welded to the bars 7 and 8 and supported in vertical position by brace bars 13 and 14, having horizontal positions 15 extending parallel with the bars 7 and 8 and having flattened portions 16 fixed to the uprights. The uprights are also connected by cross bars 18 having ears 19 that are secured thereto. The ends of the horizontal portions of the brace bars curve downwardly, as at 20, to provide a stream-line effect and to connect with the end bars 6.

The uprights 9—10 and 11—12 are preferably formed of strap material and are of sufficient height to mount the horse 3 so that it clears the base frame. The side faces of the uprights extend in planes parallel with the longitudinal dimension of the base, and the upper ends are bent laterally and twisted, as at 21, to form laterally projecting arms 22.

The arms 22 on the respective sides of the device are interconnected by horizontal guide bars 23 and 24, preferably by welding as shown in Fig. 3. The ends of the guide bars 23 and 24 are curved inwardly and rounded as at 25, for a purpose later described.

The uprights are further connected at points intermediate their height by cross bars 26 and 27, similar to the cross bars 19 previously described. Fixed to the upper cross bars 27 is a horizontally positioned plate 28 to mount the lower ends of shock absorbing springs 29 and 30, later described.

Slidably telescoped over the uprights, and suspended therefrom by coil springs 31, is a movable frame 32 including a rectangular portion 33 having side bars 34 slidably engaging the outer side faces of the uprights and connected at their ends by cross bars 35, the side bars being of length to space the cross bars a sufficient distance so as to provide a wide range of rocking movement of the movable frame on the uprights. Extending laterally from the side bars 34 are arms 36 located below and normally in the vertical plane of the arms 22 when the movable frame is at rest. The arms 36 are also arranged with the sides thereof in vertical planes, and are twisted as at 37 so that the ends terminate in upwardly extending guide arms 38, which slidably contact the outer faces of the bars 23 and 24, and which are connected at their upper ends by arcuate-shaped portions 39 substantially conforming to the cross-sectional shape at the top of the body portion of the hobby-horse.

The guides 38 are of sufficient length to provide ample up and down movement of the movable frame without striking of the rectangular portion against the brace bars of the frame. The adjacent sides of the respective bars 38 have curved ears or lugs 40 located at the ends of the arch to engage the bars 23 and 24 and retard downward movement of the movable frame under thrusts of the rider.

The springs 31 have hook-shaped ends 41 and 42 that engage within openings 43 and 44 of the respective arms, the openings being of substantially the same size as the gauge of the wire from which the springs are formed so as to avoid noises incidental to backlash.

The shock-absorbing springs 29 and 30 are of spiral shape and larger at the base than at their upper ends, the upper ends of which engage a longitudinal bar 45 that is fixed to the median points of the arches as best shown in Fig. 3.

The brace bars of the base portion of the device are provided with shock-absorbing guards 46, preferably in the form of resilient tubes, that are sleeved over the bars and secured in position to be engaged by the rectangular portion of the movable frame. The movable frame is thus mounted for vertical movement upon the uprights responsive to expansion and contraction of the suspended springs under bouncing action of the rider. The movable frame is also free to dip forward and backward as the rider shifts his weight to the front and back of the movable frame to give a bucking and bouncing effect to the horse.

The body of the horse is preferably formed of sheet metal, papier-mâché, or similar material, and is hollow to enclose the action-giving parts of the machine, the lower part of the body being provided with an opening of sufficient size to pass the movable frame which is secured to the horse by fastening devices 47, such as rivets, extending through openings 48 in the body of the horse. The horse may be provided with a saddle 49, bridle 50, and other equipment and decorations as desired. It is desirable that the saddle 49 be formed as a part of the horse since the base structure makes it difficult to pass saddle retaining devices such as straps or the like around the horse.

The contacting parts of the bars 23 and 24 with the inner faces of the bars 38, and the contacting faces of the bars 34 with the faces of the uprights, are preferably coated with graphite or similar lubricating material to reduce friction and eliminate noises. The hook portions of the springs may be similarly coated as well as the ends 25 of the guide bars. The rectangular section of the movable frame is preferably formed so that there is no lateral play with respect to the uprights. The same is true of the upper guide bars 23 and 24 which engage the inner faces of the bars 38. The contacting parts, however, are sufficiently loose to allow freedom of movement in fore and aft and up and down directions to give bouncing effects.

In using a device constructed as described, a child mounts the saddle and shifts his body to produce movements of the horse upon its supporting frame under control of the springs 29, 30 and 31. Since the movable frame is freely mounted on the springs it is adapted to move up and down and pitch forward and backward so as to give the simulation of a bucking and bounding bronco.

From the foregoing it is apparent that I have provided an amusement device which is attractive in appearance and of light weight, but of strong, rigid construction.

What I claim and desire to secure by Letters Patent is:

1. A device of the character described including a base having an upright frame, arms extending laterally from the upright frame, guide bars connecting said arms, a movable frame including a rectangular portion telescopingly and swingingly slidable longitudinally over the upright frame, lateral arms on said rectangular portion, springs connecting the lateral arms on the upright frame with the lateral arms on the movable frame, and arch-shaped members connecting the arms and having sliding contact with said guide bars to prevent transverse swinging of the movable frame while swinging longitudinally relative to the upright frame.

2. A device of the character described including a base having an upright frame, arms extending laterally from the upright frame, guide bars connecting said arms, a movable frame including a rectangular portion telescopingly slidable over the upright frame, lateral arms on said rectangular portion, springs connecting the lateral arms on the upright frame with the lateral arms on the movable frame, arch-shaped members connected with the arms and having sliding contact with said guide bars, and stops located on said arch-shaped members in position to engage the guide bars for limiting downward movement of the movable frame.

3. A device of the character described including a base having an upright frame, arms extending laterally from the upright frame, guide bars connecting said arms, a movable frame including a rectangular portion telescopingly slidable over the upright frame, lateral arms on said rectangular portion, springs connecting the lateral arms on the upright frame with the lateral arms on the movable frame, arch-shaped members connected with the arms and having swinging and sliding contact with said guide bars in the longitudinal direction thereof, an auxiliary spring support on the upright frame, and auxiliary springs located on said support substantially in planes extending through the axes of the first named springs and engaging under said arch-shaped members.

4. A device of the character described including a base having an upright frame, arms extending laterally from the upright frame, guide bars connecting said arms, a movable frame including a rectangular portion telescopingly slidable over the upright frame, lateral arms on said rectangular portion, springs connecting the lateral arms on the upright frame with the lateral arms on the movable frame, arch-shaped members connected with the arms and having sliding contact with said guide bars, an auxiliary spring support on the upright frame, auxiliary springs located on said support in planes extending through the axes of the first named springs and supporting said arch-shaped members, and an animal simulating hollow body covering said movable frame and arranged with its longitudinal axis in a plane extending through the axes of said auxiliary springs.

5. In a device of the character described, a base having an upright frame supported thereon, pairs of lateral arms projecting from the sides of said upright frame, a movable frame including a rectangular portion slidable over said upright frame and having side bars slidably contacting the upright frame in the longitudinal direction of said side bars, pairs of lateral arms extending from said rectangular portion below the first pairs of arms, and springs connecting the respective arms on the upright frame with the corresponding arms on the movable frame and arranged to effect yielding swinging movement of the movable frame in the direction of said sliding contact.

6. In a device of the character described, a base having an upright frame supported thereon and provided with horizontal and vertical guide portions, a movable frame telescoped with respect to the upright frame and having vertical and horizontal guide portions respectively engaging said horizontal and vertical guide portions, and springs connecting the movable frame with the upright frame for yielding movement in a vertical direction and swinging movement in longitudinal direction with respect to the horizontal guide portions of said frames.

7. A device of the character described including a base having an upright frame, a movable frame slidable in a vertical direction over the upright frame and rockably movable longitudinally of said upright frame, springs connecting the movable frame with the upright frame, and upper and lower guide means on one of the frames and contacting the other to limit lateral play of the movable frame in a sidewise direction.

8. In a device of the character described, a base having an upright frame supported thereon and provided with horizontal and vertical guides, a movable frame telescoped with respect to the upright frame and having vertical and horizontal guides respectively engaging said horizontal and vertical guides, tension springs connecting the movable frame with the upright frame for yielding movement in a vertical direction and swinging movement in a longitudinal direction with respect to the horizontal guides of said frames, and compression springs engaged between said frames.

ERNEST T. FRISK.